Nov. 29, 1932.  H. W. LORD  1,889,608

STROBOSCOPIC APPARATUS

Filed June 19, 1931

Inventor:
Harold W. Lord,
by Charles E. Mullan
His Attorney.

Patented Nov. 29, 1932

1,889,608

UNITED STATES PATENT OFFICE

HAROLD W. LORD, OF SCHENECTADY, NEW YORK, ASSIGNOR TO GENERAL ELECTRIC COMPANY, A CORPORATION OF NEW YORK

STROBOSCOPIC APPARATUS

Application filed June 19, 1931. Serial No. 545,613.

My invention relates to apparatus for use as a stroboscope or for other purposes where it is desirable to obtain a light flash or sudden flow of current in synchronism with an alternating current. In carrying my invention into effect I employ a vapor electric discharge device which is energized and controlled from an alternating current circuit. Phase modifying and energy storage means are associated with the energizing and control circuits of the discharge device to cause the latter to be conductive at only one point in the alternating current wave at which point a considerable amount of energy is released. This sudden flow of current may be utilized to produce a flash either in the discharge device itself or in other suitable apparatus connected in its circuit.

Figure 2:
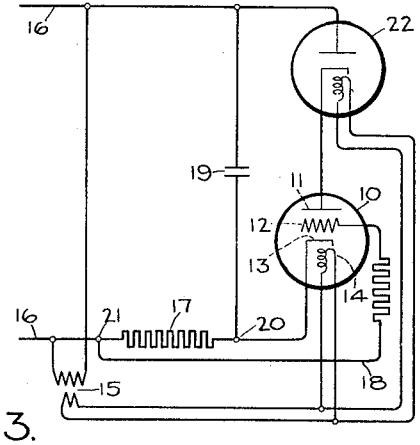
Figure 3:
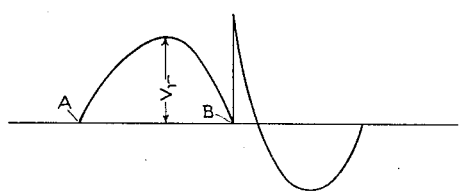
Figure 4:
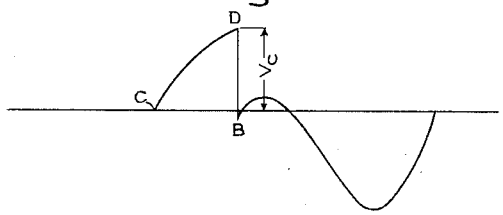
Figure 5:
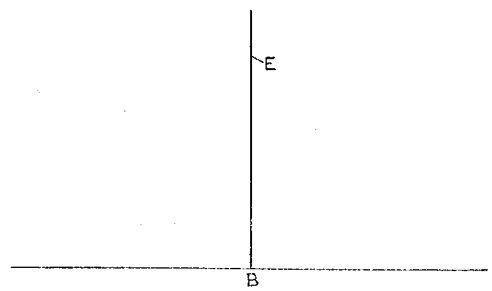

The features of my invention which are believed to be novel and patentable will be pointed out in the claims appended hereto. For a better understanding of the invention reference is made in the following description to the accompanying drawing which illustrates in Fig. 1 a simple embodiment of my invention where a three-electrode vapor discharge device is energized and controlled from an alternating current circuit using a condenser and a resistance for producing the desired operation. Fig. 2 shows an arrangement where a second vapor discharge device without any control grid is connected in series with a three-electrode vapor discharge device controlled substantially as in Fig. 1. Figs. 3, 4 and 5 are curves respectively representative of the grid voltage, voltage across the discharge device, and current through the discharge device of Fig. 1 during a cycle of operation.

Figure 1:
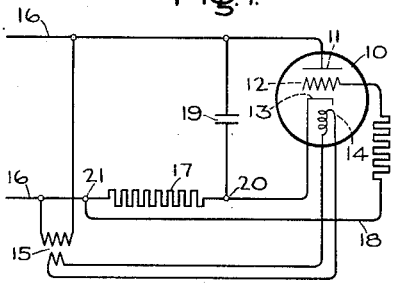

Referring now to Fig. 1, the three-electrode tube indicated at 10 is a vapor discharge device which will carry or pass current in only one direction. It comprises a plate 11, the grid 12, and heated cathode 13. 14 indicates a heater for the cathode and 15 a suitable source of supply for the heating element. The cathode and plate are connected across an alternating current circuit 16 through a resistance 17, the line side of the latter having a connection 18 to the grid 12. A condenser 19 is connected across the plate and cathode terminals of the tube.

With the arrangement described when an alternating current voltage is impressed across 16 the voltages across the condenser 19 and the resistance 17 are 90 degrees out of phase and these voltages are so impressed across the tube and upon the grid thereof that the grid voltage lags behind the anode or plate voltage by 90 degrees. Thus the condenser is charged to its peak voltage when the voltage applied to the grid passes through zero from minus to plus. The grid prevents the tube from conducting previous to this point in the cycle. However, at the instant the minus grid voltage becomes zero or the critical grid voltage, depending upon the characteristics of the particular tube used, the tube becomes conducting and the energy stored in the condenser is instantaneously discharged through the tube resulting in an intense flash of light of short duration, an effect very suitable for a stroboscope.

The action may be more fully explained with the aid of the curves in Figs. 3, 4 and 5, which respectively represent oscillograph records of the voltage across resistance 17, the voltage across the condenser 19, and the current flowing through the tube 10 during a cycle of operation, the time axis of all the curves being the same and coordinated so that a vertical line drawn through all three curves represents the same time instant.

Except as distorted by the operation of the tube, the line voltage will be the vector sum of the voltages represented in the curves of Figs. 3 and 4, and the voltage of these curves will be 90 degrees apart in time phase, the voltage across the resistance 17 leading the voltage across the condenser 19. The voltage curve of Fig. 3 represents the voltage between points 20 and 21, Fig. 1, or the voltage between the cathode 13 and grid 12, the grid being negative with respect to the cathode for values plotted above the zero line in Fig. 3. It is seen therefore that between points A and B the grid is negative with respect to the cathode and the tube will not conduct current. This voltage represented between points A and B of Fig. 3 is produced by current flowing through resistance 17 to the condenser 19, and during the time CB of Fig. 4 the condenser is being charged so that the voltage across it increases from C to D, causing the plate 11 to become positive with respect to cathode 13 in accordance with that portion of the curve of Fig. 4 plotted above the zero line. The tube is therefore in a condition to pass current except for the negative bias on the grid. At point B, however, when the voltage between cathode and anode is a maximum in the direction to cause current to flow through the tube, the negative grid voltage becomes zero rendering the tube conductive. A large current represented at E in Fig. 5 flows through the tube for an instant, releasing the energy stored in the condenser which now discharges through the tube. The inherent inductance of the loop formed by the connecting leads between the condenser and the tube or tubes forms an oscillating circuit of very high period and is sufficient to maintain the condenser discharge current long enough to slightly reverse the charge on the condenser and thus reverse the anode voltage. The grid voltage has now become negative and prevents further flow of the current through the tube when the anode again becomes positive later in the cycle. At no other time during the remainder of the cycle are the grid and plate potentials such at the same instant to allow current to pass through the tube. Thus this device produces the heavy instantaneous flow of current in one direction as represented in Fig. 5 one per cycle and causes a brilliant sharp instantaneous flash in the tube particularly suitable for stroboscopic observations of any apparatus operating synchronously or asynchronously with the frequency of the supply circuit. The curves of Figs. 3, 4 and 5 were obtained under the following conditions: The voltage of source 16 was 127 volts at 60 cycles, the resistance 17 was 200 ohms and the condenser 19 had a capacity of 14 microfarads. The values of voltage represented by $V_r$ and $V_c$ in Figs. 3 and 4 respectively were approximately 115 and 127 volts, and the current through the tube was approximately 70 amperes peak. The foregoing data merely represents one possible combination and the result thereof. I, of cource, do not wish to limit my invention thereto.

In Fig. 2 I have represented the apparatus shown in Fig. 1 together with a second vapor discharge device 22 in series with the tube 10, the condenser 19 being connected across both tubes. The operation of this vapor discharge apparatus as a whole will be substantially the same as above described but the light available when the current flows through both tubes once per cycle will be increased.

While I have mentioned the use of the invention as a stroboscope for which I have found it very satisfactory, it may be used for any purpose requiring instantaneous current impulses of appreciable magnitudes.

What I claim as new and desire to secure by Letters Patent of the United States, is:

1. In combination with an alternating current source of supply, means for producing instantaneous current impulses which are synchronous with the frequency of said source, comprising vapor electric discharge apparatus, said apparatus having a cathode connected to one side of the source, a resistance included in said connection, a grid for the discharge apparatus connected to the line side of said resistance, a plate electrode for said apparatus connected to the other side of the line, and a condenser connected between said cathode and plate electrodes.

2. In combination with a source of alternating current, apparatus for producing instantaneous current flows in synchronism with the frequency of such source, comprising a vapor discharge device having a cathode plate and grid electrodes, the cathode and plate electrodes being connected across the source of supply, a resistance included in the cathode line connection, a connection from the line end of such resistance to the grid, and a condenser connected between the anode and cathode of said discharge device.

3. In combination with an alternating current supply, a vapor electric discharge device having cathode grid and plate electrodes, phase modifying means including a condenser energized from said source for producing out-of-phase voltages, and connections from said phase modifying means to the electrodes of said discharge device for impressing the condenser voltage between the cathode and plate electrodes, and a voltage between the cathode and grid electrodes which lags the condenser voltage by about 90 degrees.

4. In combination with an alternating current source of supply, a vapor electric discharge device, said device having plate, grid and cathode electrodes, a condenser and a resistance connected in series relation across said source providing voltages which are 90 degrees out of phase, connections for impressing one of said voltages across the plate and cathode electrodes of said device, connections for impressing the other of said voltages between the cathode and grid of said device, the connections impressing grid and plate voltages on said device such as to render the tube conductive at only one instant during the alternating voltage wave of said source at which time the condenser discharges through the device.

5. In combination with a source of alternating current supply, a vapor electric discharge device energized from said source, a condenser energized from said source, and means for controlling the discharge device so that the condenser is discharged through said device once per cycle of the source of supply to produce an instantaneous current impulse in one direction therethrough and so that no current flows through said device for the remainder of the cycle.

6. In combination with an alternating current supply, a pair of vapor electric discharge devices having cathode and plate electrodes connected in series relation across said source, a condenser connected in parallel with said devices across said source, one of said devices having a control grid, a resistance included in the line connection to the cathode of one of said devices, and a connection from the line side of said resistance to said grid.

7. In combination with an alternating current source, a vapor electric discharge device provided with a control grid, means for causing the instantaneous discharge of said device once per cycle of said source including means connected across said source and device for storing energy from said source over a portion of each cycle, and means for controlling the grid voltage of said device so as to render the device conductive for an instant during each cycle when the energy storage means is substantially fully charged.

In witness whereof, I have hereto set my hand.

HAROLD W. LORD.